(12) United States Patent
Schemmel

(10) Patent No.: US 9,150,208 B2
(45) Date of Patent: Oct. 6, 2015

(54) PARK BRAKE LOGIC

(71) Applicant: Caterpillar Global Mining LLC, Oak Creek, WI (US)

(72) Inventor: Justen J. Schemmel, Oak Creek, WI (US)

(73) Assignee: Caterpillar Global Mining LLC, Oak Creek, WI (US)

( * ) Notice: Subject to any disclaimer, the term of this patent is extended or adjusted under 35 U.S.C. 154(b) by 154 days.

(21) Appl. No.: 13/718,006

(22) Filed: Dec. 18, 2012

(65) Prior Publication Data

US 2014/0172240 A1 Jun. 19, 2014

(51) Int. Cl.
*B60Q 1/00* (2006.01)
*B60T 17/18* (2006.01)
*B60T 7/14* (2006.01)
*B60Q 5/00* (2006.01)
*B60Q 9/00* (2006.01)

(52) U.S. Cl.
CPC . *B60T 17/18* (2013.01); *B60Q 9/00* (2013.01); *B60T 7/14* (2013.01)

(58) Field of Classification Search
USPC .......................................................... 701/49
See application file for complete search history.

(56) References Cited

U.S. PATENT DOCUMENTS

| | | | | | |
|---|---|---|---|---|---|
| 2,740,947 | A | * | 4/1956 | Davies | 180/273 |
| 3,381,269 | A | * | 4/1968 | Fierbaugh et al. | 340/457 |
| 3,651,457 | A | * | 3/1972 | Sprouse | 340/457.3 |
| 3,723,968 | A | * | 3/1973 | Kelly | 340/457.3 |
| 4,482,885 | A | * | 11/1984 | Mochida | 340/457 |
| 4,495,484 | A | * | 1/1985 | Kawakatsu et al. | 340/457 |
| 4,629,043 | A | * | 12/1986 | Matsuo et al. | 477/184 |
| 4,877,294 | A | * | 10/1989 | Kuhn et al. | 303/9 |
| 4,967,182 | A | * | 10/1990 | Foster | 340/457.3 |
| 5,370,449 | A | | 12/1994 | Edelen et al. | |
| 5,394,137 | A | * | 2/1995 | Orschek | 340/453 |
| 5,630,489 | A | | 5/1997 | Bebernes | |
| 6,015,364 | A | * | 1/2000 | Le Van | 477/97 |
| 6,246,313 | B1 | * | 6/2001 | Baker et al. | 340/425.5 |
| 6,287,236 | B1 | | 9/2001 | Ishikawa | |
| 6,644,838 | B2 | * | 11/2003 | Stidham et al. | 362/494 |
| 6,758,298 | B2 | * | 7/2004 | Eberling et al. | 180/272 |
| 6,905,235 | B2 | * | 6/2005 | Stidham et al. | 362/494 |
| 6,951,528 | B2 | | 10/2005 | Ewinger et al. | |
| 6,997,521 | B2 | | 2/2006 | Jensen et al. | |
| 7,108,410 | B2 | * | 9/2006 | Stidham et al. | 362/494 |

(Continued)

FOREIGN PATENT DOCUMENTS

GB 2453562 4/2009
JP 7323837 12/1995

*Primary Examiner* — John R Olszewski
*Assistant Examiner* — Jean-Paul Cass
(74) *Attorney, Agent, or Firm* — Foley & Lardner LLP

(57) ABSTRACT

A braking system may include a first brake, a parking brake, a warning system, and a control system. A parking brake system may allow an operator to selectively engage the parking brake. The control system may include a first brake detector that indicates when the first brake is engaged, a parking brake detector that indicates when the parking brake is engaged, and a door state detector that indicates when a door open. The control system may selectively activate a portion of the parking brake system when the first brake is engaged, activate the warning system when the door is open and the parking brake is engaged, and activate the warning system when the door is open, the parking brake is engaged, and the first brake is engaged. A speed sensor may be used to prevent the parking brake from engaging above a predetermined speed.

20 Claims, 3 Drawing Sheets

(56) References Cited

U.S. PATENT DOCUMENTS

| | | |
|---|---|---|
| 7,815,546 B2 * | 10/2010 | Jagodzinski .................. 477/185 |
| 8,044,788 B2 * | 10/2011 | Lundgren et al. .......... 340/457.3 |
| 8,504,268 B2 * | 8/2013 | Baier-Welt et al. ............. 701/70 |
| 8,583,339 B2 * | 11/2013 | Diekmeyer et al. ............. 701/70 |
| 2003/0075981 A1 * | 4/2003 | Chen ........................... 307/10.1 |
| 2004/0004842 A1 * | 1/2004 | Stidham et al. ................ 362/494 |
| 2005/0195616 A1 * | 9/2005 | Stidham et al. ................ 362/548 |
| 2011/0187559 A1 * | 8/2011 | Applebaum .................. 340/907 |

* cited by examiner

PARK BRAKE LOGIC

TECHNICAL FIELD

The present disclosure relates to a braking system for a vehicle, and more particularly to a parking brake system for heavy duty vehicles like large mining trucks, dump trucks etc.

BACKGROUND

A parking brake is used to engage a portion of a drivetrain of a vehicle to substantially prevent or inhibit movement of the vehicle when parked. For example, U.S. Pat. No. 6,997,521 relates to a brake system for a vehicle having a parking brake system, a service brake system, and a braking control system. The braking control system is adapted to receive a parking brake signal and a speed signal. When the parking brake signal is received, if the speed signal is greater than a certain value, then the service brake may be engaged. In some instances both the service brake and the parking brake may be engaged if the speed signal is greater than a certain value and/or the parking brake may be engaged if the speed signal is below a certain value.

In another example, U.S. Pat. No. 5,370,449 relates to a parking brake system for applying a hydraulic parking brake using a dual solenoid valve. The dual solenoid valve is configured to move from a park position to a gear select position. When in the park position, pressure is removed from the parking brake to apply the parking brake. An electronic control unit is configured to receive a parking select signal, a speed <3 MPH signal, and sense the pressure in the hydraulic line. If the speed <3 MPH signal and the park select signal are received, the solenoid valve is activated to remove pressure and apply the parking brake. If the speed <3 MPH is not received, then a warning device may be energized. If the ignition is off and park has not been selected, then a park lamp may blink for a period of time. If the ignition is off, but the pressure in the hydraulic line is still high after a period of time, the warning device may be energized.

In still another example, U.S. Pat. No. 5,630,489 relates to a parking brake control system for automating the engagement of spring-applied, pressure-released parking brakes when the vehicle is parked and for preventing the parking brakes from engaging when the vehicle is in motion or not in neutral.

In yet another example, U.S. Pat. No. 6,758,298 relates to a bus door/service brake interlock system. The interlock system includes a foot valve assembly to apply the service brakes when warning lights are activated, the vehicle door is open, and a minimum speed is met. An alarm may be activated when low pressure is detected.

In a further example, U.K. Patent Number GB 2453562 relates to a pneumatic braking system. When pressure is not applied, the parking brake and handbrake systems remain applied and the service brake is not activated. A reset valve is manually operated by an operator to pressurize the pneumatic system once the vehicle is started. When the system is pressurized, the handbrake may be released. A door valve and alarm valve are provided to sound a horn when the door is opened and the parking brake is not applied. The horn remains on even if the door is closed and can only be deactivated by applying the service brake.

SUMMARY

In one aspect, the present disclosure describes a braking system for a vehicle. The braking system may include a first brake, a parking brake, a warning system, and a control system. The parking brake may be associated with a parking brake system that is adapted to allow an operator to selectively engage the parking brake. The control system may be associated with the first brake, the parking brake, and the warning system. The control system may include a first brake state detector adapted to output a first brake signal when the first brake is engaged, a parking brake state detector adapted to output a parking brake signal when the parking brake is engaged, and a door state detector adapted to output a door position signal when a door is in an open position. The control system may be further adapted to selectively activate a portion of the parking brake system in response to receiving the first brake signal, activate the warning system in response to receiving the door position signal and the parking brake signal is not received, and activate the warning system in response to receiving the door position signal, the parking brake signal, and the first brake signal.

In another aspect, the present disclosure describes a method for controlling a brake system of a vehicle to properly engage a parking brake and provide warnings to an operator. The method may include the step of receiving, at a control system, a first brake signal from a first brake detector if a first brake is engaged, a parking brake signal from a parking brake detector if the parking brake is engaged, a door position signal from a door state detector if a door of the vehicle is open, and a vehicle speed signal indicative of the speed of the vehicle from a speed sensor. The method may include the step of preventing, using the control system, the parking brake from engaging if the speed signal is above a predetermined value or if the first brake signal is not received by the control system. The method may further include the step of activating a warning system if the door position signal is received by the control system and the parking brake signal is not received or if the door position signal, the parking brake signal, and the first brake signal are received by the control system.

In yet another aspect, the present disclosure describes a braking system for a vehicle having a load brake, a parking brake, a warning system, a speed sensor, and a control system. The speed sensor may be adapted to determine a speed of the vehicle. The control system may be associated with the load brake, the parking brake, the warning system, and the speed sensor. The control system may include a load brake state detector adapted to determine if the load brake is engaged, a parking brake state detector adapted to determine if the parking brake is engaged, and a door state detector adapted to determine if a door is in an open position. The control system may be adapted to prevent the parking brake from engaging if the load brake state detector indicates the load brake is not engaged or the speed sensor indicates the speed of the vehicle is above a predetermined level, activate the warning system if the door state detector indicates that the door is in the open position and the parking brake state detector does not indicate that the parking brake is engaged, and activate the warning system if the door state detector indicates that the door is in the open position, the parking brake state detector indicates that the parking brake is engaged, and the load brake state detector indicates the load brake is engaged.

Other features and aspects of this disclosure will be apparent from the following description and the accompanying drawings.

DETAILED DESCRIPTION

Figure 1:
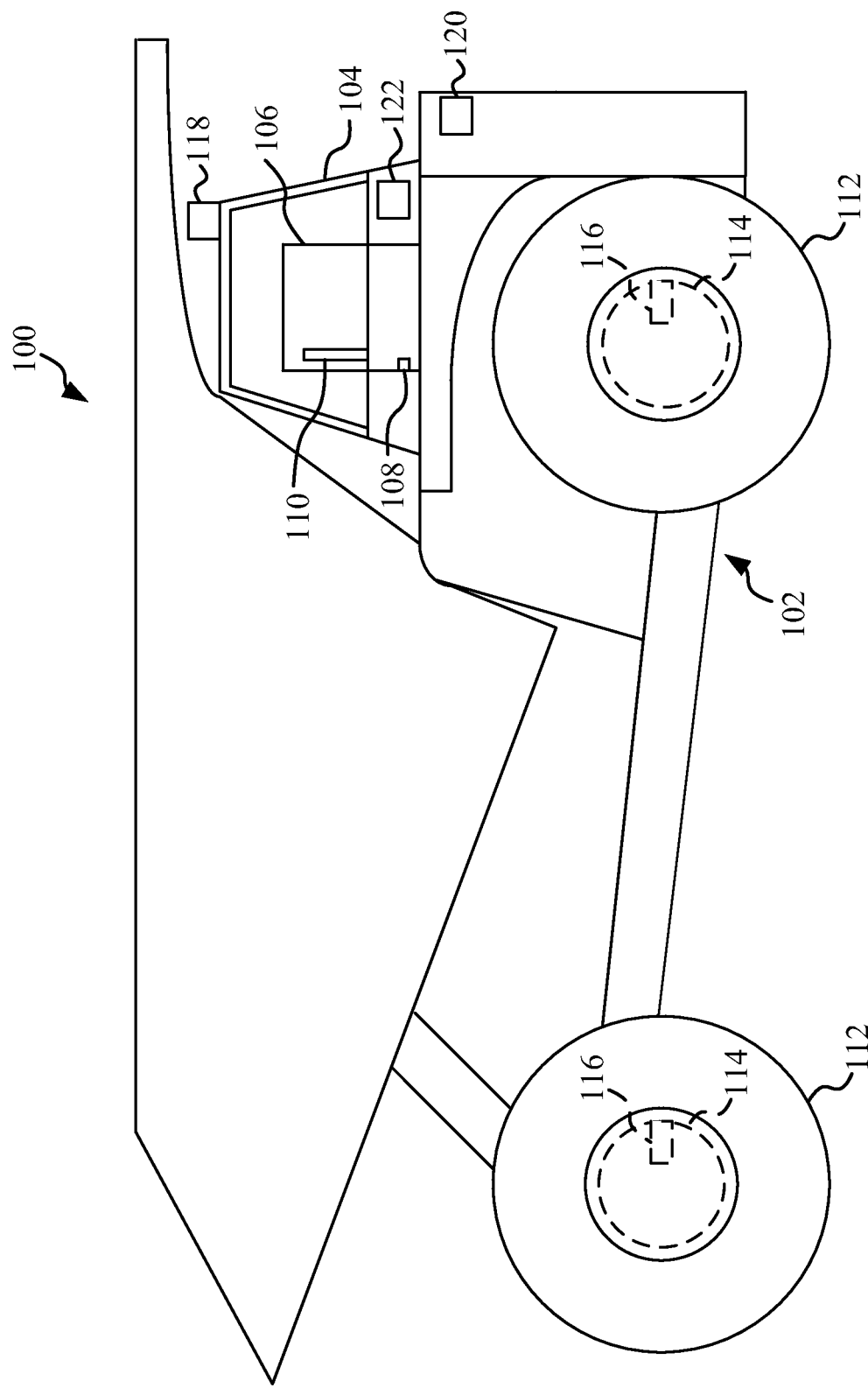
FIG. 1 illustrates a side elevation view of an example vehicle having a braking system, according to an aspect of the present disclosure.

The present disclosure relates to a braking system for a vehicle. In particular, the present disclosure relates to a braking system having a first brake and a parking brake.

In some instances, the first brake may be a load brake that may be engaged when a vehicle is loaded and/or unloaded. For example, on a mining truck used to haul rock or other materials, the load brake may be useful to engage and substantially resist rotation of one or more wheels while the truck is being loaded or unloaded. Such a load brake may be used, in some cases, to ensure that a vehicle is substantially stopped and/or moving slowly.

A parking brake may also be included to resist rotation of the wheels when the vehicle is intended to be parked. Such a parking brake may be especially useful when the operator exits the vehicle. With no operator present in a cab of the vehicle, if the parking brake is not engaged and/or is improperly engaged, then the vehicle may unexpectedly move or roll away in the absence of another object or system that prevents the vehicle from moving. For instance, if a vehicle's transmission is set to neutral and the vehicle is on an incline, then the vehicle may roll away and potentially damage the vehicle, other vehicles, and/or property if the parking brake is not engaged or improperly engaged. Accordingly, ensuring that the vehicle is properly prevented from moving using the parking brake may be useful to alleviate such safety concerns.

In some instances, it may be useful to prevent the parking brake from being applied above certain speeds and/or interlocking the parking brake with another system. This may ensure that the parking brake is applied only when the vehicle is stopped or moving very slowly. As will be discussed in greater detail herein, some examples of implementing such a feature may include controlling the operation of the parking brake based on output from a speed sensor and/or interlocking the operation of the parking brake with another brake, such as the load brake.

If the parking brake is applied while the vehicle is moving at an excessive speed, the parking brake may incur unnecessary wear and/or may damage other components of the parking brake system. Such wear may reduce the effectiveness of the parking brake and/or incur additional repair costs to fix or replace components of the parking brake system. Moreover, such wear and/or damage may cause the parking brake to cease to be effective at resisting movement of the vehicle. If the parking brake ceases to be effective, then the vehicle may roll away, even if the parking brake is applied. Accordingly, it may be useful to provide a system that assists in having the operator properly engage the parking brake.

In addition, or in the alternative, to the wear and/or damage that may result from applying the parking brake at an excessive speed, the use of another brake when parking the vehicle may mask or otherwise hide issues with a parking brake that does not engage properly. For example, if the load brake and the parking brake are engaged when the vehicle is intended to be parked, then it may not be known to the operator whether the parking brake is effective at resisting movement of the vehicle. If the parking brake is not effective and the load brake also fails, then the vehicle may roll away or otherwise be out of control. Accordingly, it may be useful to provide a system that assists in having the operator properly engage the parking brake for this reason as well.

Furthermore, in releasing the parking brake to permit the vehicle to move after being parked, it may be useful to engage another brake to help avert unintended disengagements of the parking brake. For example, interlocking the parking brake with another brake, such as the load brake, may help avoid inadvertent releases of the parking brake by requiring the other brake to be engaged prior to releasing the parking brake. Such a system may be useful in preventing the parking brake from disengaging even if an operator accidentally hits a release control for the parking brake.

In still a further instance, it may also be useful to provide an indication via a warning system to the operator when certain conditions exist. For example, when the parking brake is not set and a door to the cab is opened, the warning system may be activated to remind the operator to set the parking brake prior to exiting the cab. In another example, the warning system may be activated when the parking brake and the load brake are engaged and the door to the cab is opened. In yet another instance, the warning system may be activated when neither the parking brake nor the load brake is applied and a door to the cab is opened. Still other conditions may be implemented as well to alert the operator to various conditions.

FIG. 1 illustrates an example vehicle 100 having a body 102 and one or more wheels 112. In the present example, vehicle 100 is depicted as a mining truck, though it should be understood that the present disclosure can be used with other vehicles, such as articulated trucks, dozers, front loaders, tractor scrapers, semi-tractors, passenger vehicles, etc. In addition, wheels 112 are merely examples and other ground engaging systems, such as tracks, or other components used to move the vehicle 100 may be used.

Body 102 may include a frame configured to support various components of the vehicle 100, such as an engine, a transmission, a driveshaft, a suspension system, etc. In the present example, the body 102 includes an operator cab 104 having a door 106 to permit entry and exit from the operator cab 104. A door state detector 108 is provided to detect when the door 106 is opened or closed. In one example, a magnetic door switch may be used to output a door position signal when the door 106 is opened. Of course other door state detectors 108 may be used to determine whether a door is opened or closed, such as mechanical switches, optical detectors and/or sensors, RFID detectors and/or sensors, etc.

The operator cab 104 includes a seat 110 in which an operator may sit and control the vehicle 100 while in operation. In some implementations, a seat occupancy sensor (shown in FIG. 2) may be provided to output a seat occupancy signal indicative of a weight on the seat 110 (i.e. representative of an operator, etc.). For example, the seat occupancy sensor may be configured to output a signal when the weight on the seat exceeds or is below a predetermined level. For example, the predetermined level may be 10 kg. Accordingly, an operator may be less likely to trick the seat occupancy sensor into detecting that the seat 110 is occupied by leaving an object having a nominal weight on the seat. Of course other weight values may be used as well. Such a seat occupancy signal may be used to activate a warning system, described below, if the operator leaves the seat under certain conditions.

In some other instances, a seatbelt sensor (shown in FIG. 2), may be used with the seat 110 to output a seatbelt signal indicative of a disengaged or engaged seatbelt. Such a seatbelt signal may be used to activate the warning system, described below, if the operator disengages the seatbelt under certain conditions. Seatbelt sensor may include a magnetic switch, a mechanical switch, an optical switch, etc.

In still further instances, a gear selection sensor (shown in FIG. 2), may be used to output a gear signal indicative of a selected gear of the vehicle 100. For example, the gear selection sensor may be located within the operator cab 104 and is mechanically and/or electrically coupled to a gear selection control (e.g., a shift lever, one or more gear selection buttons, etc.). The gear signal may be used to activate the warning system if the gear selection sensor indicates a certain gear (e.g., neutral, park, etc.) is selected under certain conditions.

In some instances, a speed sensor (shown in FIG. 2), may be used to output a vehicle speed signal indicative of a speed of the vehicle 100. For example, the speed sensor may measure a rotation rate of a gear, driveshaft, and/or other portion of the transmission to determine the speed or may measure the speed of the vehicle 100 through any other manner. In some implementations, described below, the vehicle speed signal may be used to prevent or otherwise inhibit the parking brake from engaging under certain conditions.

In the present example, the operator cab 104 includes a visual device 118. The visual device 118 is shown mounted to an exterior portion of the operator cab 104, though in other versions the visual device 118 may be located on an interior of the operator cab 104, such as a light on a dashboard. In still further versions, several visual devices 118 may be located on the exterior and/or interior of the vehicle 100, such as brake lights, head lights, warning flashers, dashboard indicators, overhead lights, etc. In one example, several dashboard indicators may be used to specifically indicate why the warning system was activated (e.g., "Engage Parking Brake," "Disengage Load Brake," etc.). In other instances, a series of flashes may be indicative of the specific reason why the warning system was activated. As will be described below, the visual device 118 may be used to provide a visual indication to an operator when the warning system is activated (e.g., by flashing one or more lights on and off for a period of time, turning on one or more lights for a period of time, etc.).

An audible device 120 is also provided near the operator cab 104. The audible device 120 is shown mounted to an exterior portion of the vehicle 100, though in other versions the audible device 120 may be located on an interior of the operator cab 104, such as a speaker on a dashboard. In still further versions, several audible devices 120 may be located on the exterior and/or interior of the vehicle 100, such as horns, speakers, sirens, etc. As will be described below, the audible device 120 may be used to provide an audible indication to an operator when the warning system is activated (e.g., by activating a horn periodically, by continually operating the horn, by providing a voice reproduction to speak to the operator, etc.). In one example, several variations to the audible indications may be used to specifically indicate why the warning system was activated (e.g., a specific series of horn sounds, a vocal indication of the specific reason, such as "Please engage the parking brake," etc.).

A control system 122 is also shown located with the operator cab 104. The control system 122, as will be described in greater detail below, is associated with a first brake 114 (shown in phantom) and a parking brake 116 (also shown in phantom). In some instances, a first brake system (shown in FIG. 2) and a parking brake system (also shown in FIG. 2) may be used with control system 122 to control the first brake 114 and parking brake 116, respectively. The control system 122 may also be associated with the door state detector 108, the seat occupancy sensor, the seatbelt sensor, the gear selection sensor, the visual device 118, the audible device 120, and/or any other aspect of the vehicle 100.

The vehicle 100 includes one or more first brakes 114 for selectively engaging and resisting movement of the wheels 112. For example, the vehicle 100 may include service brakes that may be used to slow and/or stop the vehicle 100 during operation. The vehicle 100 may also include one or more load brakes to selectively engage one or more wheels 112 when loading or unloading the vehicle 100. In some instances, the load brakes may be a subset of the service brakes (e.g., the rear service brakes, the front service brakes, etc.). Such load brakes may be useful to restrict movement of a portion of the vehicle (e.g., a front or rear end) without having to engage all of the service brakes. In one example, the load brakes may selectively engage and resist movement of the rear wheels 112 of the vehicle 100. Accordingly, when the vehicle is loaded and/or unloaded, the load brakes resist movement of the rear wheels 112 without applying the brakes to the front wheels 112. In other instances, the load brakes may be applied to a single wheel, three wheels, four wheels, etc. In one example, the brakes 114 may be hydraulic forced oil-cooled disc brakes. A braking feature (e.g., a brake pad, braking plate, etc.) may be hydraulically actuated by a piston to engage and disengage a friction disc to provide frictional resistance to rotation of the wheel 112 coupled to the disc. Of course other brakes may be used as well.

In some vehicles 100, a parking brake 116 may be used as well. The parking brake 116 may be provided as a sub-assembly of the first brakes 114 to selectively engage and resist rotation of the associated wheel 112. Parking brakes 116 may be associated with the first brakes 114 for each wheel 112 of the vehicle 100 such that each wheel 112 has a parking brake 116 resisting rotation of the wheel 112 when the parking brakes 116 are engaged. Thus, should a parking brake 116 wear out or is otherwise not effective in resisting rotation of one wheel 112, one or more additional parking brakes 116 may substantially resist movement of the vehicle 100. In some implementations, the parking brake 116 may include an oil-cooled, spring-applied, hydraulically released parking brake. Accordingly, it should be understood that the mechanical spring will engage and apply the parking brake 116 should the hydraulic system lose pressure.

While the foregoing has generally described features of one example vehicle 100, it should be understood that other features and/or other vehicles may be used.

Figure 2:
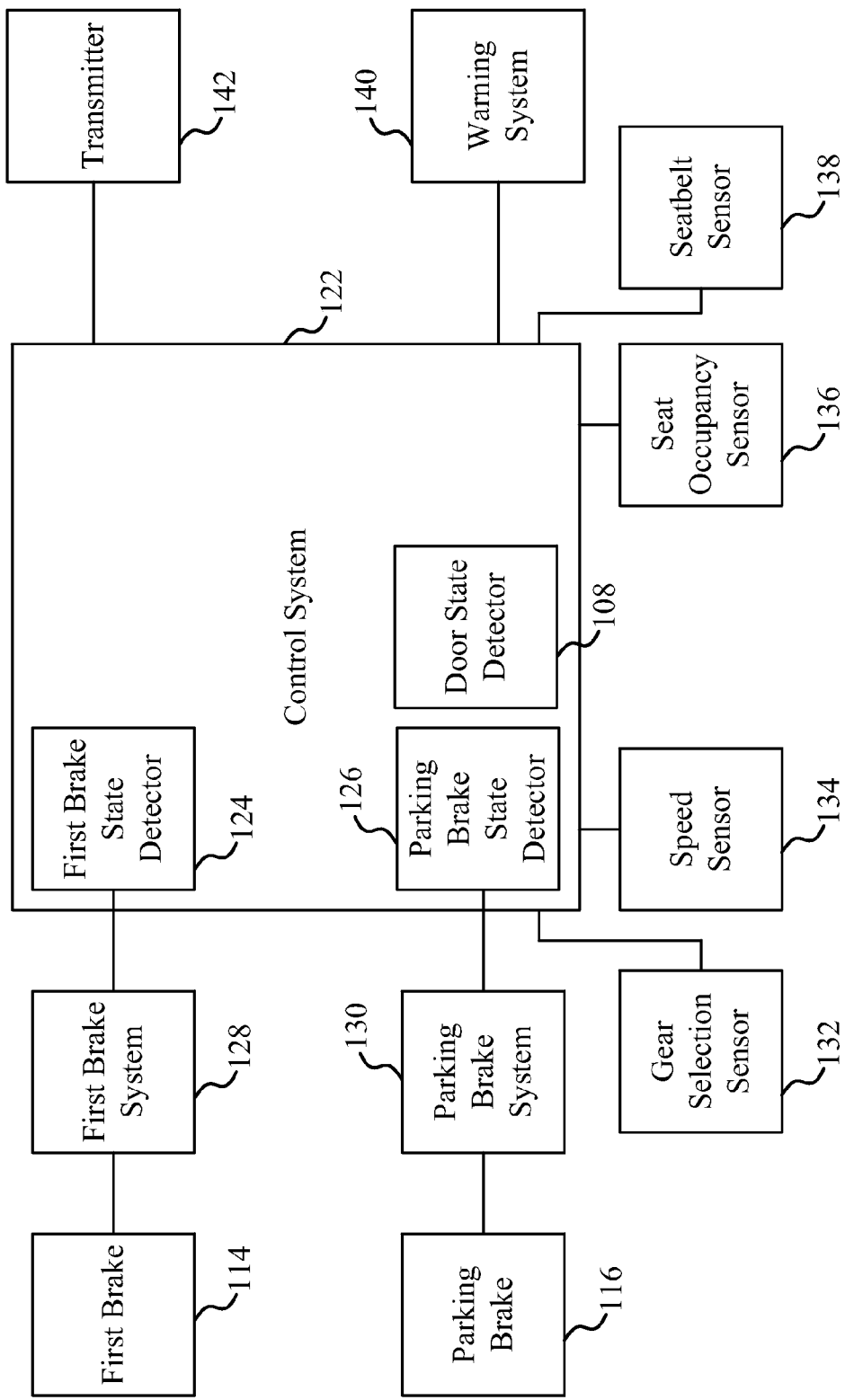
FIG. 2 illustrates a block diagram of an example braking system having a first brake system associated with a first brake, a parking brake system associated with a parking brake, and a control system, according to an aspect of the present disclosure.

FIG. 2 depicts an example block diagram of an example braking system and illustrating the control system 122 and several components that may be associated with the control system 122. In the example shown, the control system 122 includes a first brake state detector 124, a parking brake state detector 126, and the door state detector 108. The first brake state detector 124 and the parking brake state detector 126 may include switches, relays, sensors, and/or other components for indicating that the first brake 114 and/or the parking brake 116 are engaged. The first brake state detector 124 is adapted to output a first brake signal when the first brake 114 is engaged. The parking brake state detector 126 is adapted to output a parking brake signal when the parking brake 116 is engaged.

The first brake state detector 124 is coupled to a first brake system 128. The first brake system 128 is operable to engage and disengage the first brakes 114. For example, in the instance of a mining truck, the first brake system 128 may include an operator control, such as a pedal, lever, selection button, etc., that, when used, causes a hydraulic system to pressurize to engage the first brakes 114 to resist rotation of one or more wheels 112. In some instances, the first brake system 128 may include both a service brake system and a load brake system. The service brake system may be operable to engage all of the first brakes 114, while the load brake system may be operable to engage a subset of the first brakes 114 (e.g., only the rear brakes, only the front brakes, a diagonal pair of brakes, a single brake, etc.). In an example system with a load brake system, the first brake state detector 124 may be a load brake state detector that is adapted to output a load brake signal when the load brakes are applied.

In some instances, the first brake state detector 124 may be configured to selectively decouple power from a parking brake system 130, or a portion thereof, such that the parking brake system 130 is interlocked with the first brakes 114. Accordingly, an operator may be prevented from causing the parking brake system 130 to engage or disengage the parking brake 116 without the first brake 114 being engaged. Interlocking the parking brake 116 with the first brake 114 may provide an added measure of safety regarding inadvertent engagement or disengagement of the parking brake 116. In some instances, the parking brake 116 may be interlocked with the load brakes and not the service brakes. Of course other components may be interlocked with the parking brake 116 in addition to, or instead of, the first brake 114 and/or load brake. Further still, the first brake 114 and/or load brake may be interlocked with other aspects and/or system of the vehicle 100 (e.g., selecting a gear, unlocking a steering wheel, etc.).

The parking brake state detector 126 is coupled to the parking brake system 130. The parking brake system 130 is operable to engage and disengage the parking brakes 116. For example, in the instance of a mining truck, the parking brake system 130 may include an operator control, such as a pedal, lever, selection button, etc., that, when used, causes a hydraulic system to depressurize to engage the parking brakes 116 to resist rotation of one or more wheels 112 when the vehicle is to be parked. It should be appreciated that, if the hydraulic system loses pressure, the parking brakes 116 will engage to resist movement of the vehicle 100. However, as noted above, if the first brake 114 is engaged using the hydraulic system, the effectiveness of the parking brake 116 may not be known when parking the vehicle 100. Accordingly, as will be described in reference to FIG. 3, a warning system 140 may be activated if both the first brake 114 and the parking brake 116 are engaged and the operator attempts to leave the operator cab 104.

The control system 122 may also include and/or be coupled to the gear selection sensor 132, the speed sensor 134, the seat occupancy sensor 136, and the seatbelt sensor 138, though it should be understood that one or more of these may be omitted. As will be discussed in reference to FIG. 3, one or more of the foregoing sensors may be used by the control system 122 to activate the warning system 140 in conjunction with the first brake state detector 124, parking brake state detector 126, and/or door state detector 108.

The warning system 140 may be coupled to the visual device 118 and/or the audible device 120. For example, the warning system 140 may be configured to periodically flash one or more lights and activate one or more horns when the warning system 140 is activated. As noted above, the lights and/or horns may be on the exterior and/or interior of the vehicle 100 to provide visual and/or audible indications to the operator under various conditions.

A transmitter 142 is also coupled to the control system 122. In some implementations, the transmitter 142 may receive a signal from the control system 122 when the warning system 140 is activated. The transmitter 142 may transmit the signal to a remote device (not shown) at a remote location, such as a computing device at a construction headquarters, a mining headquarters, a company building, etc. In some instances, the transmission may include an identifier such that the vehicle 100 from which the transmission originated may be identified. Accordingly, additional oversight for the vehicle 100 may be provided to reduce the potential for a vehicle 100 to be left unattended when the warning system 140 is activated. In still further instances, the transmissions may be logged for future reference and/or otherwise used.

In some implementations, the transmitter 142 may be a transceiver such that the control system 122 may receive transmissions from the remote device. For example, in some implementations, if the warning system 140 is activated and not deactivated within a predetermined period of time, a signal may be sent from the remote device to remotely operate one or more systems of the vehicle 100. In one example, if the parking brake system 130 is not engaged after a predetermined period of time, such as 10 seconds, the remote device may transmit a signal to cause the control system 122 to engage the parking brakes 116. Of course the transmitter 142 may be omitted.

Figure 3:
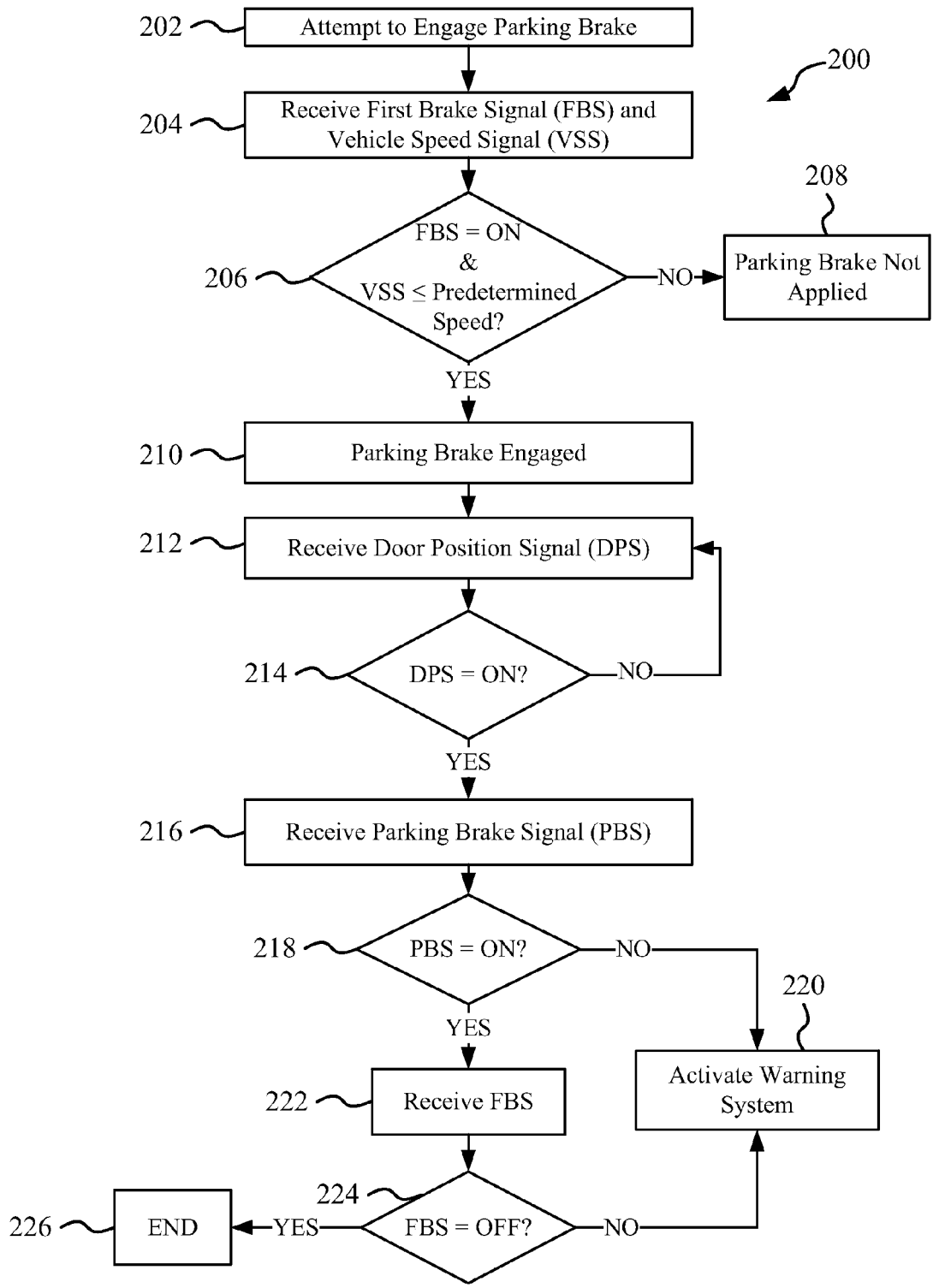
FIG. 3 an example flow diagram of an example process for controlling the braking system, according to an aspect of the present disclosure.

FIG. 3 illustrates an example process 200 for selectively preventing the parking brake 116 from engaging and activating the warning system 140 under certain conditions. In the example shown, process 200 may begin with an attempt to engage or apply the parking brake at block 202. Such an attempt may result from an operator using an operator control of the parking brake system 130. At block 204, the first brake signal and a vehicle speed signal may be received from the first brake state detector 124 and the speed sensor 134, respectively.

A determination at decision block 206 is made as to whether the first brake signal is on and the vehicle speed signal is at or below a predetermined speed. The predetermined speed may be approximately 5 KPH. Of course other predetermined speeds may be used as well. If either the first brake signal is not on or the vehicle speed signal indicates a vehicle speed greater than the predetermined speed, the control system 122 may prevent the parking brakes 116 from being applied at block 208. Accordingly, the parking brakes 116 may be prevented from engaging when unwanted wear or damage to the parking brakes 116 may occur.

In some instances, the first brake system 128 and/or first brake state detector 124 may directly and selectively decouple or couple power to the parking brake system 130 and/or a portion thereof. For example, the first brake state detector 124 may include a switch that selectively provides power to the operator control of the parking brake system 130 only when the first brakes 114 are applied. Accordingly, the parking brakes 116 may be interlocked with the first brakes 114 to assist in avoiding inadvertent engagement or disengagement of the parking brakes 116. In other implementations, the control system 122 may selectively couple or decouple power to the parking brake system 130 or a portion thereof in response to receiving the first brake signal. In one example implementation, the first brakes 114 may be load brakes such that the parking brakes 116 are interlocked with the load brakes of the vehicle 100. Accordingly, the parking brakes 116 may only be engaged or disengaged when the load brakes are engaged.

If the first brake signal is on and the vehicle speed signal indicates a vehicle speed at or below the predetermined speed, then the parking brake may be permitted to be engaged by the parking brake system 130 at block 210. The door position signal may be received from the door state detector 108 at block 212. At decision block 214, a determination is made whether the door position signal is on. If the door position signal is not on, thereby indicating that the door 106 has not been opened, then the process 200 returns to block 212 until the door 106 is opened.

If it is determined that the door position signal is on, thereby indicating that the door 106 of the operator cab 104 has been opened, then the process 200 proceeds to block 216 to receive the parking brake signal from the parking brake state detector 126. At decision block 218, a determination is made whether the parking brake signal is on. If the parking brake signal is off, indicating that the parking brakes 116 are not engaged (either due to the operator not engaging the parking brakes 116 or another problem), then the warning system 140 may be activated at block 220. Thus, the process 200 may provide an audible or visual indication, such as via a horn or light, to remind the operator to engage the parking brakes 116 prior to leaving the vehicle 100 potentially unattended. It should be understood that the warning system 140 may be activated at block 220 when the door 106 is opened and either the load brake is applied, but the parking brakes are not applied or both the load brake and the parking brakes are not applied (e.g., an operator stops the vehicle 100 and shifts the vehicle 100 into neutral without applying either brake). Such a warning may assist in safer parking of the vehicle 100 in some implementations.

If the parking brake signal is on, then the process 200 proceeds to block 222 to receive the first brake signal from the first brake state detector 124. In some instances, the first brake signal may be monitored such that block 222 may be omitted (e.g., in a circuit arrangement with relays). At decision block 224, a determination is made whether the first brake signal is off. If the first brake signal is not off, thereby indicating that the first brakes 114, such as load brakes, are still applied, the process 200 may proceed to block 220 to activate the warning system 140. Thus, the process 200 may provide an audible or visual indication, such as via a horn or light, to remind the operator to disengage the first brakes 114 prior to leaving the vehicle 100 potentially unattended. By reminding the operator to disengage the first brakes 114, such as load brakes, the operator may be able to determine whether the parking brakes 116 are effective in resisting movement of the vehicle 100 or not. If the operator disengages the first brakes 114 and the parking brakes 116 are not effective, the vehicle 100 may move, thereby allowing the operator to determine whether to move the vehicle 100 to a safer location (e.g., a flat area where movement of the vehicle 100 is unlikely) and/or to use an alternative method to resist movement of the vehicle 100. Such a warning may assist in safer parking of the vehicle 100 in some implementations.

If the first brake signal indicates that the first brakes 114 are disengaged, then the process ends at block 226.

In some implementations, one or more of the sensors described above may be used in addition to and/or in lieu of the door state detector 108. For example, the seat occupancy signal from the seat occupancy sensor 136 may be used to indicate whether an operator is present on the seat 110, even if the door 106 is opened. Accordingly, the warning system 140 may not be activated if another person, such as a person outside of the vehicle, opens the door 106 of the vehicle 100 while the operator remains seated in the seat 110. In some instances, the seat occupancy signal may be used without the door state detector 108. Accordingly, the seat occupancy sensor may activate the warning system 140 when the operator leaves the seat 110 even if the door 106 is not opened.

Similarly, the seatbelt signal from the seatbelt sensor 138 may be used to indicate whether an operator is present on the seat 110, even if the door 106 is opened. Accordingly, the warning system 140 may not be activated if another person, such as a person outside of the vehicle, opens the door 106 of the vehicle 100 while the operator remains belted in the seat 110. In some instances, the seatbelt signal may be used without the door state detector 108. Accordingly, the seatbelt sensor may activate the warning system 140 when the operator unbuckles a seatbelt of the seat 110 even if the door 106 is not opened.

In another example, the gear signal from the gear selection sensor 132 may be used to indicate whether the vehicle 100 is in a gear that may benefit from the parking brakes 116 being applied and/or for redundancy purposes. For example, if the vehicle is in a gear other than neutral and/or park when the vehicle 100 is intended to be parked, the warning system 140 may be activated to alert the operator that the transmission is in an incorrect gear. In another implementation, the gear signal may be used for redundancy and/or in lieu of the door state detector. Such a signal may be indicative of the operator intending to park the vehicle 100 as well.

In some implementations, the determinations described above may be implemented using relays in a circuit-based control system 122. In some other implementations, the control system 122 may include a processing module and/or processing circuit and a non-transitory computer-readable medium (e.g., ROM, RAM, a hard drive, a solid state drive, etc.). The computer-readable medium may include instructions that, when read by the processing module, cause certain operations to be performed. Accordingly, the control system 122 may include programming to receive input from the first brake detector 124, the parking brake detector 126, door state detector 108, gear selection sensor 132, speed sensor 134, seat occupancy sensor 136, and/or seatbelt sensor 138 and control the first brake system 128, the parking brake system 130, the warning system 140, and/or the transmitter 142.

INDUSTRIAL APPLICABILITY

The braking system of the present disclosure is intended to assist in the protection of the parking brake 116 and/or components thereof from undue wear or damage resulting from improper application of the parking brake 116 under certain conditions, such as the vehicle 100 travelling at an excessive speed.

As the vehicle 100 travels, the operator may command the parking brake 116 to engage before the vehicle 100 comes to a complete stop. When an operator attempts to engage the parking brake 116, the process 200 of FIG. 3 determines whether the first brakes 114 are applied and the vehicle speed is in at or below a preferred vehicle speed range—for example, from zero to five kilometers per hour. If the first brakes 114 are not applied, as indicated by the first bake signal from a first brake state detector 124, then the process 200 of FIG. 3 prevents the parking brake system 130 from engaging the parking brakes 116. In one implementation, this may include an interlock relationship between the first brakes 114 and the parking brakes 116 such that power is decoupled from the parking brake system 130 and/or a portion thereof, such as an operator control. In addition, if the vehicle speed is not within the preferred range, the parking brakes 116 will not be engaged either, thereby avoiding excessive wear and/or damage to the parking brakes 116. When the front brakes 114 are engaged and the vehicle speed is brought into the preferred vehicle speed range, the parking brakes 116 may be applied as the operator commanded.

In addition, the braking system is also intended to provide an indication to the operator when certain conditions are present via the warning system 140 such that the operator may alleviate the conditions prior to leaving the vehicle 100 unattended. For example, the warning system 140 may be activated when the parking brakes 116 are not engaged and the door 106 is opened; when the parking brakes 116 and the first brakes 114, such as load brakes, are both engaged and the door 106 is opened; when the operator is not present in the seat 110; when the vehicle 100 is not in a gear for parking; etc. The warning system 140 may activate a visual device 118 and/or an audible device 120 to alert the operator to the condition such that that the condition may be remedied.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A braking system for a vehicle comprising:
   a first brake;
   a parking brake associated with a parking brake system, wherein the parking brake system is adapted to allow an operator to selectively engage the parking brake;
   a warning system; and
   a control system associated with the first brake, the parking brake, and the warning system, wherein the control system comprises:
      a first brake state detector adapted to output a first brake signal when the first brake is engaged,
      a parking brake state detector adapted to output a parking brake signal when the parking brake is engaged, and
      a door state detector adapted to output a door position signal when a door is in an open position,
   wherein the control system is adapted to:
      activate a portion of the parking brake system in response to receiving the first brake signal,
      activate the warning system in response to receiving the door position signal without receiving the parking brake signal, and
      activate the warning system in response to receiving the door position signal indicating the door is open, the parking brake signal indicating the parking brake is engaged, and the first brake signal indicating the first brake is engaged.

2. The braking system according to claim 1 further comprising:
   a speed sensor adapted to output a vehicle speed signal indicative of a speed of the vehicle;
   wherein the control system is further adapted to prevent the parking brake from engaging when the vehicle speed signal is above a predetermined value.

3. The braking system according to claim 1 further comprising:
   a seat occupancy sensor adapted to output a seat occupancy signal indicative of a weight on a seat of the vehicle,
   wherein the control system is further adapted to activate the warning system in response to receiving the door position signal, the parking brake signal, and the seat occupancy signal is below a predetermined value.

4. The braking system according to claim 1 further comprising:
   a seatbelt sensor adapted to output a seatbelt signal indicative of a disengaged seatbelt,
   wherein the control system is further adapted to activate the warning system in response to receiving the door position signal, the parking brake signal, and the seatbelt signal.

5. The braking system according to claim 1 further comprising:
   a gear selection sensor adapted to output a gear signal indicative of a selected gear of the vehicle,
   wherein the control system is further adapted to activate the warning system in response to receiving the door position signal, the parking brake signal, and the gear signal indicating the vehicle is in a gear other than a neutral or park gear.

6. The braking system according to claim 1, wherein the first brake detector is configured to interlock the parking brake system with the first brake such that the first brake must be engaged in order to engage or disengage the parking brake system.

7. The braking system according to claim 1, wherein the warning system comprises an audible device.

8. The braking system according to claim 7, wherein the audible device is a horn.

9. The braking system according to claim 1, wherein the warning system comprises a visual device.

10. The braking system according to claim 9, wherein the visual device is a light located on an interior of the vehicle.

11. The braking system according to claim 9, wherein the visual device is a light located on an exterior of the vehicle.

12. The braking system according to claim 1, wherein the first brake is a load brake that is hydraulically applied and the parking brake is mechanically applied.

13. The braking system according to claim 1 further comprising:
   a transmitter coupled to the control system, wherein the transmitted is configured to output a signal to a remote device when the warning system is activated.

14. A method for controlling a brake system of a vehicle to properly engage a parking brake and provide warnings to an operator, the method comprising the steps of:
   receiving, at a control system:
      a first brake signal from a first brake detector if a first brake is engaged,
      a parking brake signal from a parking brake detector if the parking brake is engaged,
      a door position signal from a door state detector if a door of the vehicle is open, and
      a vehicle speed signal indicative of the speed of the vehicle from a speed sensor; and
   preventing, at the control system, the parking brake from engaging if the speed signal is above a predetermined value or if the control system fails to receive the first brake signal; and
   activating a warning system if:
      the door position signal is received by the control system without receiving the parking brake signal, and
      the door position signal that indicates the door is open, the parking brake signal that indicates the parking brake is engaged, and the first brake signal that indicates the first brake is engaged are received by the control system.

15. The method according to claim 14, wherein the step of preventing the parking brake from engaging comprises disconnecting power from a portion of the parking brake system operable to engage the parking brake.

16. The method according to claim 15, wherein the predetermined speed is 5 KPH.

17. The method according to claim 16, wherein the warning system comprises a flashing light and a horn.

18. The method according to claim 17 further comprising the step of:
   preventing, at the control system, the parking brake from disengaging in absence of the first brake signal.

19. A braking system for a vehicle comprising:
   a load brake;
   a parking brake;
   a warning system;
   a speed sensor adapted to determine a speed of the vehicle; and
   a control system associated with the load brake, the parking brake, the warning system, and the speed sensor, wherein the control system comprises:
      a load brake state detector adapted to determine if the load brake is engaged,
      a parking brake state detector adapted to determine if the parking brake is engaged, and
      a door state detector adapted to determine if a door is in an open position, wherein the control system is adapted to:
   prevent the parking brake from engaging if the load brake state detector indicates the load brake is disengaged or the speed sensor indicates the speed of the vehicle is above a predetermined level,
   activate the warning system if the door state detector indicates that the door is in the open position without receiving the parking brake state detector, and
   activate the warning system if the door state detector indicates that the door is in the open position, the parking brake state detector indicates that the parking brake is engaged, and the load brake state detector indicates the load brake is engaged.

20. The braking system according to claim 19, wherein the warning system comprises a horn and a light, wherein the warning system is configured to periodically activate the horn and the light when activated.

* * * * *